(12) United States Patent
Lalgudi et al.

(10) Patent No.: US 8,129,069 B2
(45) Date of Patent: Mar. 6, 2012

(54) FUEL CELL COMPONENTS INCLUDING IMMOBILIZED HETEROPOLYACIDS

(75) Inventors: Ramanathan S. Lalgudi, Columbus, OH (US); Jay R. Sayre, Gahanna, OH (US); Bhima R. Vijayendran, Dublin, OH (US)

(73) Assignee: Battelle Memorial Institute, Columbus, OH (US)

(*) Notice: Subject to any disclaimer, the term of this patent is extended or adjusted under 35 U.S.C. 154(b) by 341 days.

(21) Appl. No.: 11/992,826

(22) PCT Filed: Sep. 29, 2006

(86) PCT No.: PCT/US2006/038397
§ 371 (c)(1),
(2), (4) Date: Aug. 20, 2010

(87) PCT Pub. No.: WO2007/041473
PCT Pub. Date: Apr. 12, 2007

(65) Prior Publication Data
US 2011/0003231 A1 Jan. 6, 2011

Related U.S. Application Data

(60) Provisional application No. 60/722,857, filed on Sep. 30, 2005, provisional application No. 60/731,441, filed on Oct. 28, 2005, provisional application No. 60/736,815, filed on Nov. 15, 2005, provisional application No. 60/748,658, filed on Dec. 8, 2005, provisional application No. 60/819,357, filed on Jul. 7, 2006.

(51) Int. Cl.
*H01M 8/10* (2006.01)
(52) U.S. Cl. .......... 429/479; 429/496; 429/532; 521/28

(58) Field of Classification Search .................. 429/479, 429/496, 532
See application file for complete search history.

(56) References Cited

U.S. PATENT DOCUMENTS

| 4,476,199 A | 10/1984 | Takeuchi et al. |
| 6,569,309 B2 | 5/2003 | Otsuka et al. |

(Continued)

FOREIGN PATENT DOCUMENTS
CN 1624963 6/2005
(Continued)

OTHER PUBLICATIONS

Prado et al. Journal of Non-Crystalline Solids 351 (2005) 2194-2199.*

(Continued)

*Primary Examiner* — Jane Rhee
(74) *Attorney, Agent, or Firm* — MacMillan, Sobanski & Todd, LLC

(57) ABSTRACT

A fuel cell component is made with a composite including a proton conducting polymer, a water insoluble proton conducting inorganic material, and a heteropolyacid immobilized by chemically bonding to the inorganic material. In another embodiment, the fuel cell component is made with a composite including a non-proton conducting polymer, a water insoluble inorganic material, and a heteropolyacid immobilized by chemically bonding to the inorganic material, the heteropolyacid causing the composite to show proton conductivity. In a further embodiment, the fuel cell component is made with a composite comprising a proton conducting polymer, a water insoluble proton conducting inorganic material, and a heteropolyacid immobilized by chemically bonding to the inorganic material, the composite having substantially identical structure of the unmodified heteropolyacid.

22 Claims, 2 Drawing Sheets

U.S. PATENT DOCUMENTS

| | | |
|---|---|---|
| 6,716,548 B1 | 4/2004 | Kaliaguine et al. |
| 6,878,475 B2 | 4/2005 | Wixom et al. |
| 6,893,763 B2 | 5/2005 | Fan et al. |
| 6,953,873 B2 | 10/2005 | Cortright et al. |
| 6,962,959 B2 | 11/2005 | Kurano et al. |
| 7,008,971 B2 | 3/2006 | Taft, III et al. |
| 7,090,738 B2 | 8/2006 | Kanaoka et al. |
| 7,094,490 B2 | 8/2006 | Cao et al. |
| 7,118,821 B2 | 10/2006 | Hong et al. |
| 7,144,652 B2 | 12/2006 | Alberti et al. |
| 7,183,017 B2 | 2/2007 | Taft, III et al. |
| 2002/0058173 A1 | 5/2002 | Alberti et al. |
| 2003/0029733 A1 | 2/2003 | Otsuka et al. |
| 2003/0194593 A1 | 10/2003 | Fan et al. |
| 2003/0219532 A1 | 11/2003 | Kanaoka et al. |
| 2003/0220531 A1 | 11/2003 | Cortright et al. |
| 2004/0028978 A1 | 2/2004 | Honma et al. |
| 2004/0053113 A1 | 3/2004 | Nishikawa et al. |
| 2004/0081823 A1 | 4/2004 | Arai |
| 2004/0106030 A1 | 6/2004 | Wixom et al. |
| 2004/0115516 A1 | 6/2004 | Miyake et al. |
| 2004/0247975 A1 | 12/2004 | Song et al. |
| 2005/0053818 A1 | 3/2005 | St-Arnaud et al. |
| 2005/0100662 A1 | 5/2005 | Ohba et al. |
| 2006/0036064 A1 | 2/2006 | McGrath et al. |
| 2006/0099476 A1 | 5/2006 | Watakabe et al. |
| 2006/0116479 A1 | 6/2006 | Lee et al. |
| 2006/0141334 A1 | 6/2006 | Nakajima et al. |
| 2006/0148953 A1 | 7/2006 | Hong et al. |
| 2006/0159974 A1 | 7/2006 | Li et al. |
| 2006/0159975 A1 | 7/2006 | Kim et al. |
| 2006/0165576 A1 | 7/2006 | Lee et al. |
| 2007/0015023 A1 | 1/2007 | Song et al. |

FOREIGN PATENT DOCUMENTS

| | | |
|---|---|---|
| JP | 2003229143 | 8/2003 |
| JP | 2003317737 | 11/2003 |
| JP | 2006120620 | 5/2006 |
| WO | WO 96/29752 | 9/1996 |
| WO | WO 2005/045976 A1 | 5/2005 |
| WO | WO2005045976 * | 5/2005 |
| WO | PCT/US2006/038397 | 9/2006 |

OTHER PUBLICATIONS

Ponce et al. Desalination 162, (2004), 383-391.*
Alberti et al. Journal of Materials Chemistry, 2004, 14, 1910-1914.*
Nunes et al. Journal of Membrane Science 203 (2002) 215-225.*
Luis A. S. De A. Prado, et al., Saxs/Waxs Characterization of Proton-Conducting Polymer Membranes Containing Phosphomolybdic Acid, Journal of Non-Crystalline Solids 351 (2005), 2194-2199.
M. L. Pounce, et al., Membranes for Direct Methanol Fuel Cell Based on Modified Heteropolyacids, Desalination 162 (2004) 383-391.
M. L. Pounce, et al., Reduction of Methanol Permeability in Polyetherketone-Heteropolyacid Membranes, Journal of Membrane Science 217 (2003) 5-15.
Giulio Alberti, et al., Preparation and Proton Conductivity of Composite Ionomeric Membranes Obtained From Gels of Amorphous Zirconium Phosphate Sulophenylenphosphonates in Organic Solvents, Journal of Materials Chemistry, 2004, 1910-1914.
S.P. Nunes, Inorganic Modification of Proton Conductive Polymer Membrances for Direct Methanol Fuel Cells, Journal of Membrane Science 203 (2002) 215-225.
V. Ramani et al., Stabilized Heteropolyacid/Nafion Composite Membranes for Elevated Temperature/Low Relative Humiidity PEFC Operation, Electrochimica Acta 50 (2005), 1181-1187.
US 4,669,851, 06/1987, Kudo et al. (withdrawn)

* cited by examiner

FUEL CELL COMPONENTS INCLUDING IMMOBILIZED HETEROPOLYACIDS

CROSS-REFERENCE TO RELATED APPLICATIONS

This application claims the benefit of U.S. Provisional Application No. 60/722,857, filed Sep. 30, 2005, U.S. Provisional Application No. 60/731,441, filed Oct. 28, 2005, U.S. Provisional Application No. 60/736,815, filed Nov. 15, 2005, U.S. Provisional Application No. 60/748,658, filed Dec. 8, 2005, and U.S. Provisional Application No. 60/819,357, filed Jul. 7, 2006, the disclosures of which are incorporated herein by reference.

BACKGROUND OF THE INVENTION

This invention relates in general to fuel cell components, and in particular to polymer-containing fuel cell components such as polymer electrolyte membranes and electrodes. The polymers can include both proton conducting polymers and non-proton conducting polymers.

Fuel cells are a promising technology for generating electricity with higher efficiency and lower emissions than most current methods. Polymer electrolyte membrane ("PEM") fuel cells include a proton conducting polymer membrane sandwiched between an anode and a cathode. A fuel such as hydrogen or methanol is flowed into contact with the anode where it dissociates into electrons and protons. The electrons, which cannot pass through the membrane, flow from the anode to the cathode through an external circuit containing an electric load, which consumes the power generated by the cell. On the opposite side of the cell, the cathode adsorbs oxygen from the air, generating a potential that pulls the electrons through the external circuit to give them to the adsorbed oxygen. When an adsorbed oxygen receives two electrons it forms a negatively charged oxygen anion. The polymer electrolyte membrane allows the protons to diffuse through the membrane. When two protons encounter an oxygen anion they join together to form water. In addition to polymer electrolyte membranes, proton conducting polymers can also be used in other fuel cell components. For example, they can be used as binders along with particles of carbon-supported catalyst in the preparation of electrodes for fuel cells.

Heteropolyacids ("HPAs") are proton conducting solids often used as additives with a polymer electrolyte membrane to improve the conductivity of the membrane. Unfortunately, HPAs are highly soluble in water and as a result, if they are added by mixing with a proton conducting polymer to prepare a polymer electrolyte membrane, they may be washed away from the membrane during fuel cell operation over a period of time. This may adversely affect the performance of the fuel cell. HPAs with low water solubility such as zirconium hydrogen phosphate have been explored to make polymer composite membranes.

The literature describes composite polymer electrolyte membranes made with HPAs, polymer, and an inorganic material. The composite membranes reported in the literature are either made by a sol-gel process [Grot, W. G.; Rajendran, G. in PCT Int. Appl.; (Du Pont, USA, WO 96/29752, 1996] or by direct mixing of inorganic filler to a polymer solution [Nunes, S. P.; Ruffmann, B.; Rikowski, E.; Vetter, S.; Richau, K. J. Membr. Sci 2002, 203, 215-225]. The sol-gel process leads to uniform distribution of inorganic particles in the polymer matrix. However, controlling the ratio of polymer to inorganic filler is difficult. The direct mixing process adequately controls the amount of inorganic filler in the polymer matrix but it is very difficult to obtain homogeneous distribution of inorganic particles. Furthermore, the particle size obtained from this procedure is large and as a result the membranes do not have adequate strength.

M. L. Poncea, L. A. S. de A. Pradoa, V. Silva, S. P. Nunes Desalination 162 (2004) 383-391, describes organic-inorganic membranes for direct methanol fuel cell application prepared from sulfonated polyether ether ketone, containing heteropolyacids and an oxide phase either generated by hydrolysis of amino-modified silanes or by dispersion of surface-modified fumed silica. The heteropolyacid contained epoxy groups that reacted with the amino-groups in the oxide phase. The reaction provided a covalent bond between the heteropolyacid and the insoluble oxide phase, resulting in its fixation in the membrane.

Ramani et al (Electrochimica Acta 50 (2005) 1181-1187) describes a method for making water insoluble HPA by ion exchanging protons of HPA with cations such as ammonium, cesium, rubidium and thallium. The water insoluble additives are formed first and then they are added to PEM. The particle size of the additives dispersed in the PEM is around a few microns. Furthermore, a 5 weight percent (wt %) loss of these additives occurs in aqueous media.

It would be advantageous to provide improved fuel cell components including polymers and heteropolyacids.

SUMMARY OF THE INVENTION

The invention relates to a fuel cell component made with a composite comprising a proton conducting polymer, a water insoluble proton conducting inorganic material, and a heteropolyacid immobilized by chemically bonding to the inorganic material.

In another embodiment, the invention relates to a fuel cell component made with a composite comprising a non-proton conducting polymer, a water insoluble inorganic material, and a heteropolyacid immobilized by chemically bonding to the inorganic material, the heteropolyacid causing the composite to show proton conductivity.

In a further embodiment, the invention relates to a fuel cell component made with a composite comprising a proton conducting polymer, a water insoluble proton conducting inorganic material, and a heteropolyacid immobilized by chemically bonding to the inorganic material, the composite having substantially identical structure of the unmodified heteropolyacid.

DETAILED DESCRIPTION OF THE PREFERRED EMBODIMENTS

Figure 1:
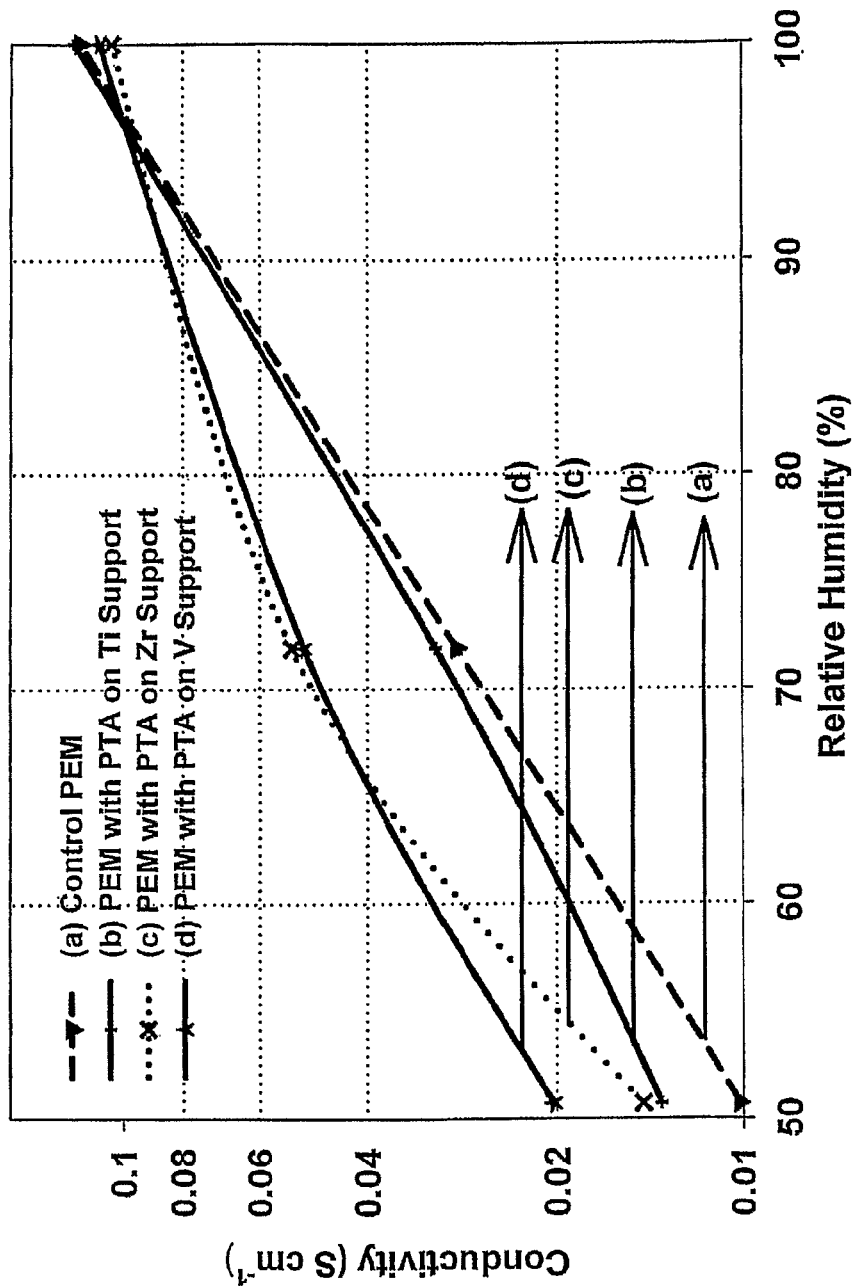
FIG. 1 shows plots of 4-point direct current ionic conductivity versus relative humidity at 80° C. for several different composite polymer electrolyte membranes in air at 0 psig as described in the Examples.

A fuel cell component according to the invention is made with a composite comprising a proton conducting polymer, a water insoluble proton conducting inorganic material, and a heteropolyacid immobilized by chemically (e.g., covalently) bonding to the inorganic material. The immobilization of the heteropolyacid on the inorganic material prevents it from being washed away from the fuel cell component.

Any suitable heteropolyacid or combinations of different heteropolyacids can be used in the composite. Many different types of heteropolyacids are known and will be developed in the future, and the invention is not limited to any particular type. In some embodiments, the heteropolyacid includes tungsten or molybdenum. Some nonlimiting examples of heteropolyacids include tungsten-based or molybdenum-based heteroatom polyacids such as phosphotungstic acid, phosphomolybdic acid and silicotungstic acid. Some specific nonlimiting examples of heteropolyacids include $H_4SiW_{12}O_{40}$, $H_4SiMo_{12}O_{40}$, $H_5SiVMo_{11}O_{40}$, $H_6SiV_2Mo_{10}O_{40}$, $H_7SiV_3Mo_9O_{40}$, $H_3PW_{12}O_{40}$, $H_3PMo_{12}O_{40}$, $H(VO)PMo_{12}O_{40}$, $H(VO)PW_{12}O_{40}$, $H_6PV_3Mo_9O_{40}$, $H_5PV_2Mo_{10}O_{40}$, $H_5PV_2W_{10}O_{40}$, $H_4PVMo_{11}O_{40}$, $H_4PVW_{11}O_{40}$, and $HBiPVMo_{10}O_{40}$. The heteropolyacids may be commercially available or may be prepared by a variety of methods. For example, general syntheses of the polyoxometallates and heteropolyacids are described in Pope et. al., Heteropoly and Isopoly Oxometallates, Springer-Verlag, New York (1983).

Any suitable water insoluble proton conducting inorganic material, or combinations of different materials, can be used in the composite. In some embodiments, the inorganic material is a metal compound or a combination of different metal compounds. Some nonlimiting examples of metal compounds include metal halides and metal oxy halides. Any suitable metal or combinations of different metals can be used in the metal compound. Some nonlimiting examples include transition metals such as Ti, V, Mn, Fe, Co, Ni, Cu, Zn, Zr, Mo, Ru, Rh, Pd, Ag, Cd, W, Pt and Au, and non-transition metals such as B, Al, Ga, In, Tl, Si, Ge, Sn, Se and Te.

The heteropolyacid can be immobilized on the inorganic material and combined with the polymer in any suitable manner to prepare the composite. In one method, an immobilization reaction of the heteropolyacid and the inorganic material is carried out in a solution including the polymer, and the materials are formed into a composite membrane. In another method, an immobilization reaction of the heteropolyacid and the inorganic material is carried out in the polymer film. As a result of the immobilization reaction, in some nonlimiting examples the heteropolyacid is immobilized on a water insoluble metal phosphate or a water insoluble metal phosphonate, or combinations thereof. For example, these may include metal phosphate, metal phosphonate, metal hydrogen phosphate, metal hydrogen phosphonate, metal pyrophosphate, and/or metal sulpho phenyl phosphate.

Preferably, the composite of the polymer, the inorganic material and the heteropolyacid has substantially identical structure of the unmodified heteropolyacid that keeps the associated water molecules in a cage-like structure. As a result of this structure, the composite has a higher acidity, and has a higher conductivity at low humidity. In one embodiment, the composite has an acidity characterized by very high ion exchange capacity greater than 1.0 meq/g. In one embodiment, the composite has a conductivity of at least 0.0001 S/cm at a relative humidity of 50%, for example between about 0.01 and about 0.2 S/cm. Further, any fuel cell components, such as a polymer electrolyte membrane, may have this conductivity. Preferably, the heteropolyacid and the inorganic material do not include functional groups before they are chemically bonded together; this helps to retain the structure of unmodified heteropolyacid.

The heteropolyacid and the inorganic material can be used in any suitable amounts in the composite. In one embodiment, the amount of immobilized HPA varies from about 0.5% to about 75% by total weight of the composite (the HPA, inorganic material and polymer), preferably from about 0.5% to about 50 wt %, and most preferably from about 0.5% to about 25 wt %. In one embodiment, the weight ratio of HPA to inorganic material ranges between about 0.1 and about 25, preferably between about 1 and about 20, and most preferably between about 3 and about 12.

The HPA immobilized in the composite preferably has one or more of the following properties: (a) the acidity of the immobilized HPA and the unmodified HPA (before being bonded to the inorganic material in the composite) are substantially identical; (b) the surface area of immobilized HPA is substantially identical to or greater than unmodified HPA; (c) the porosity of immobilized HPA is substantially identical to or greater than unmodified HPA. The HPA in the composite is preferably immobilized to the extent that it is substantially not soluble and substantially not extractable by one or more of the following: (a) liquid water; (b) 1.5 M sulfuric acid; (c) liquid methanol, ethanol, butanol and higher alcohols; (d) hydrogen peroxide; (e) formic acid.

Any type of proton conducting polymer or a combination of different polymers can be used in the invention. In some embodiments, the polymer is a thermoplastic or thermoset aromatic polymer. Some groups of these aromatic polymers include the following: polysulfone (PSU), polyimide (PI), polyphenylene oxide (PPO), polyphenylene sulfoxide (PPSO), polyphenylene sulfide (PPS), polyphenylene sulfide sulfone (PPS/SO$_2$), polyparaphenylene (PPP), polyphenylquinoxaline (PPQ), polyarylketone (PK) and polyetherketone (PEK) polymers. The polysulfone polymers include polyarylethersulfone (PAS), polyethersulfone (PES), polyetherethersulfone (PEES), polyarylsulfone, polyphenylsulfone (PPSU) and polyphenylenesulfone (PPSO$_2$) polymers. The polyetherketone polymers include polyetherketone (PEK), polyetherether-ketone (PEEK), polyetherketone-ketone (PEKK), polyetheretherketone-ketone (PEEKK) and polyetherketoneetherketone-ketone (PEKEKK) polymers. The polyimide polymers include the polyetherimide polymers and fluorinated polyimides.

Other examples of proton conducting polymers include the following:
1) Polymers which have structures with a substantially fluorinated carbon chain optionally having attached to it side chains that are substantially fluorinated. These polymers contain sulfonic acid groups or derivatives of sulfonic acid groups, carboxylic acid groups or derivatives of carboxylic acid groups, phosphonic acid groups or derivatives of phosphonic acid groups, phosphoric acid groups or derivatives of phosphoric acid groups and/or mixtures of these groups. Perfluorinated polymers include Nafion®, Flemion®, and Aciplex® commercially available from E. I. DuPont de Nemours, Asahi Glass KK and Asahi Chemical Industry respectively. 2) Perfluorinated or partially fluorinated polymers containing aromatic rings which have been functionalized with $SO_3H$, $PO_2H_2$, $PO_3H_2$, $CH_2PO_3H_2$, COOH, $OSO_3H$, $OPO_2H_2$, $OPO_3H_2$. Also included are radiation or chemically grafted perfluorinated polymers, in which a perfluorinated carbon chain, for example, PTFE, fluorinated ethylene-propylene (FEP), tetrafluoroethylene-ethylene (ETFE) copolymers, tetrafluoroethylene-perfluoroalkoxy (PFA) copolymers, poly(vinyl fluoride) (PVF) and poly(vinylidene fluoride) (PVDF) is activated by radiation or chemical initiation in the presence of a monomer, such as styrene, which can be functionalized to contain an ion exchange group. 3) Fluorinated polymers containing a polymeric chain with pendant saturated cyclic groups and at least one ion exchange group which is linked to the polymeric chain through the cyclic group. 4) Nonfluorinated polymers including hydrocarbons such as styrene-(ethylene-butylene)-styrene, styrene-(ethylene-propylene)-styrene and acrylonitrile-butadiene-styrene co- and terpolymers where the styrene components are functionalized with sulphonate, phosphoric and/or phosphonic groups. 5) Nitrogen containing polymers, for example, polybenzimidazole alkyl sulphonic acid and polybenzimidazole alkyl or aryl phosphonate.

For example, some specific examples of polymers that may be used in the invention are taught in PCT Publication No. WO/2002/025764, published Mar. 28, 2003, and the corresponding U.S. Patent Publication No. 2002/0091225 A1, published Jul. 11, 2002 (incorporated by reference herein), entitled "Ion-Conducting Sulfonated Polymeric Materials", and the preferred materials are, in particular, BPSH-xx (Bi Phenyl Sulfone) and 6F-XX-BPSH-XX (Hexafluoro Bi Phenyl Sulfone). As well, other polymers that may be used in the present invention are taught in PCT Publication No. WO/2003/082956, published Oct. 9, 2003, and the corresponding U.S. Patent Publication No. 2006/0036064 A2, published Feb. 16, 2006 (incorporated by reference herein), entitled "Sulfonated Polymer Composition for Forming Fuel Cell Electrodes"; PCT Publication No. WO/2003/067691, published Aug. 14, 2003 (incorporated by reference herein), entitled "Polymer Electrolyte Membranes for Use in Fuel Cells". Other polymers that may be used are disclosed in U.S. Pat. No. 6,670,065 B2, issued Dec. 30, 2003, U.S. Pat. No. 6,893,764 B2, issued May 17, 2005, and U.S. Patent Application Publication No. 2005/0031930 A1, published Feb. 10, 2005. Further polymers that may be used are disclosed in U.S. Provisional Application No. 60/736,815, filed Nov. 15, 2005, entitled PEM's for Fuel Cell Applications; and U.S. Provisional Application No. 60/748,658, filed Dec. 8, 2006, all entitled PEM's for Fuel Cell Applications, and the corresponding PCT App. No. PCT/US06/38281, filed Sep. 29, 2006, entitled Polymers for Use in Fuel Cell Components. The above-mentioned applications and patents are incorporated herein by reference, as if fully set forth herein. The present invention may be advantageously used with the materials described therein, which include the materials referred to as Battellion™.

For example, U.S. Provisional Application No. 60/748,658 includes the following claims: (a) A proton conducting hydrocarbon-based polymer including an aromatic hydrocarbon polymer main chain, side chains attached to the main chain, and acid groups attached to the side chains, wherein the acid groups are attached to atoms on the side chains that are between 7 and 12 atoms away from the main chain. (b) A proton conducting hydrocarbon-based polymer including a semi-fluorinated aromatic hydrocarbon polymer main chain and side chains attached to the main chain, wherein the side chains include at least one —CF2- group in the side chain and an acid group attached to the side chain. (c) A proton conducting hydrocarbon-based polymer including an aromatic hydrocarbon polymer main chain and side chains attached to the main chain, wherein the side chains include at least one —CH2-CF2- group in the side chain and an acid group attached to the side chain. (d) A proton conducting hydrocarbon-based polymer including an aromatic hydrocarbon polymer main chain and side chains attached to the main chain, and including acid groups attached to both the main chain and the side chains wherein less than about 65 wt % of the acid groups are attached to the side chains. (e) A proton conducting hydrocarbon-based polymer including an aromatic hydrocarbon polymer main chain, side chains attached to the main chain that include at least one aryl ring, and acid groups attached to both the main chain and to the aryl groups of the side chains. (f) A proton conducting hydrocarbon-based polymer including an aliphatic hydrocarbon polymer main chain, side chains attached to the main chain that include at least one deactivating aryl ring, and acid groups attached to the deactivating aryl rings of the side chains. (g) A proton conducting hydrocarbon-based polymer including an aliphatic hydrocarbon polymer main chain, and side chains attached to the main chain that include —CF2- groups in the chain and an acid group attached to the side chain. (h) A proton conducting polymer capable of forming a complex with an acid and having a metal phosphate or a metal phosphonate chemically bonded to the polymer.

In one embodiment, the proton conducting or non-proton conducting polymer used in the composite has functional groups causing the polymer to act as a steric stabilizer during production of the composite thereby stabilizing the growing particles. For example, the functional groups may be sulfonate groups or any other suitable groups. The steric stabilization helps to create composite particles having a desirably small particle size.

The composite of the polymer, the inorganic material, and the heteropolyacid may be in any suitable form. In one embodiment, the composite is in the form of desirably small particles to improve the properties of the composite. Preferably, the composite particles have an average diameter less than about 30 nanometers.

As described above, the composite can be made with a non-proton conducing polymer. Any suitable non-proton conducting polymer can be used, including any of the non-proton conducting thermoplastic or thermoset polymers known in the art. For example, polymers that are suitable for making films or membranes may be useful for making polymer electrolyte membranes according to the invention. In one embodiment, the chemical bonding of the heteropolyacid to the inorganic material, and its inclusion in the composite, surprisingly causes the composite as a whole to show proton conductivity. When the fuel cell component is a polymer electrolyte membrane, preferably the membrane has a conductivity as mentioned above.

The invention can apply to any types of fuel cell components in which the composites are determined to be useful. Some nonlimiting examples include membrane electrode assemblies, membranes, electrodes, catalyst inks, gas diffusion layers, and binders for making membrane electrode assemblies.

The fuel cell component, such as a polymer electrolyte membrane, in addition to having improved conductivity, may be able to operate at high temperatures and low humidity. The membrane may have reduced methanol crossover in a direct methanol fuel cell. In addition, the component may have enhanced mechanical and dimensional stability under fuel cell operating conditions.

EXAMPLES

Example 1

Immobilization of Phosphotungstic Acid (3 Parts) on Zirconium Phosphate (1 Part) in the Presence of Sulfonated Poly(Aryl Ether Sulfone)

In cylindrical reaction jar, weighed 6.1 grams of sulfonated poly(aryl ether sulfone) with 35% degree of sulfonation and added 50 grams of N,N'-dimethylacetamide and stirred well at room temperature to get a clear homogenous solution. To this solution added 0.64 gram of ZrOCl2.8H2O and stirred at room temperature for 2 hours followed by drop wise addition of 5 grams of N,N'-dimethylacetamide containing 1.8 gram of phosphotungstic acid. The reaction mixture was heated to 60° C. and maintained the temperature for 30 minutes to obtain a clear product.

Example 2

Immobilization of Phosphotungstic Acid (6 Parts) on Zirconium Phosphate (1 Part) in the Presence of Sulfonated Poly(Aryl Ether Sulfone)

In cylindrical reaction jar weighed 10 grams of the product obtained from Example 1 and added under agitation 0.5 gram of N,N'-dimethylacetamide containing 0.25 gram of phosphotungstic acid. The reaction mixture was heated to 60° C. and maintained the temperature for 30 minutes to obtain a clear product.

Example 3

Immobilization of Phosphotungstic Acid (12 Parts) on Zirconium Phosphate (1 Part) in the Presence of Sulfonated Poly(Aryl Ether Sulfone)

In cylindrical reaction jar weighed 10 grams of the product obtained from Example 1 and added under agitation 1.0 grams of N,N'-dimethylacetamide containing 0.5 gram of phosphotungstic acid. The reaction mixture was heated to 60° C. and maintained the temperature for 30 minutes to obtain a clear product.

Example 4

Immobilization of Phosphotungstic Acid in a Polymer Film (Method A)

A known dimension (4 cm×4 cm) of sulfonated poly(aryl ether sulfone) membrane with % sulfonic acid ~35% was taken in a beaker and added 50 milliliter (ml) aqueous solution of $ZrOCl_2.8H_2O$ (10 weight/volume %). The contents were heated to 60° C. for 2 hours. The film was removed and the excess solution on the surface of the film wiped using a Whatman 4 filter paper and immersed in 10 weight/volume % aqueous phosphotungstic acid solution. The contents were heated to 60° C. for 2 hours. The sample was then taken out and immersed in 1 $NH_3PO_4$ for 2 hours at 60° C. Finally the film was washed well with water till the washings are neutral to litmus paper.

(Method B)

A known dimension (4 cm×4 cm) of sulfonated poly(aryl ether sulfone) membrane with % sulfonic acid ~35% was taken in a beaker and added 50 ml aqueous solution of phosphotungstic acid (10 weight/volume %). The contents were heated to 60° C. for 2 hours. The film was removed and the excess solution on the surface of the film wiped using a Whatman 4 filter paper and immersed in 50 ml of $ZrOCl_2.8H_2O$ (10 weight/volume %) aqueous solution. The contents were heated to 60° C. for 2 hours. The sample was then taken out and immersed in 1 $NH_3PO_4$ for 2 hours at 60° C. Finally the film was washed well with water till the washings are neutral to litmus paper.

Example 5

Immobilization of Phosphotungstic Acid (6 Parts) on Vanadium Phosphate (1 Part) in the Presence of Sulfonated Poly(Aryl Ether Sulfone)

In cylindrical reaction jar, weighed 22.48 grams of 15 wt % sulfonated poly(aryl ether sulfone) in N,N'-dimethylacetamide with 50% degree of sulfonation and added drop wise 2.52 grams of N,N'-dimethylacetamide containing 1.5 grams of dried phosphotungstic acid. To this mixture added very carefully 0.5 ml of vanadium oxy chloride and stirred well at room temperature. The reaction mixture was heated to 60° C. and maintained the temperature for 30 minutes and then cooled down to room temperature. The product thus obtained poured on a Teflon mold and dried at 60° C. for 12 hours to get free standing film. The film thus obtained is boiled in 1.5 M sulfuric acid and washed several times with distilled water. The proton conductivity of this film at various humidity conditions is presented in FIG. 1.

Example 6

Immobilization of Phosphotungstic Acid (6 Parts) on Titanium Phosphate (1 Part) in the Presence of Sulfonated Poly(Aryl Ether Sulfone)

In cylindrical reaction jar, weighed 15.04 grams of 15 wt % sulfonated poly(aryl ether sulfone) in N,N'-dimethylacetamide with 50% degree of sulfonation and added drop wise 1.67 grams of N,N'-dimethylacetamide containing 1.0 gram of phosphotungstic acid. To this solution added very carefully 1.48 grams of 15 wt % titanium oxy chloride in HCl and stirred well at room temperature. The reaction mixture was heated to 60° C. and maintained the temperature for 30 minutes and then cooled down to room temperature. The product thus obtained poured on a Teflon mold and dried at 60° C. for 12 hours to get free standing film. The film thus obtained is boiled in 1.5 M sulfuric acid and washed several times with distilled water. The proton conductivity of this film at various humidity conditions is presented in FIG. 1. The data in FIG. 1 clearly show that the immobilized sample has improved conductivity at lower humidity compared to the control sample, while they have the same conductivity at higher humidity.

Example 7

Immobilization of Phosphotungstic Acid on Zirconium Phosphate

Figure 2:
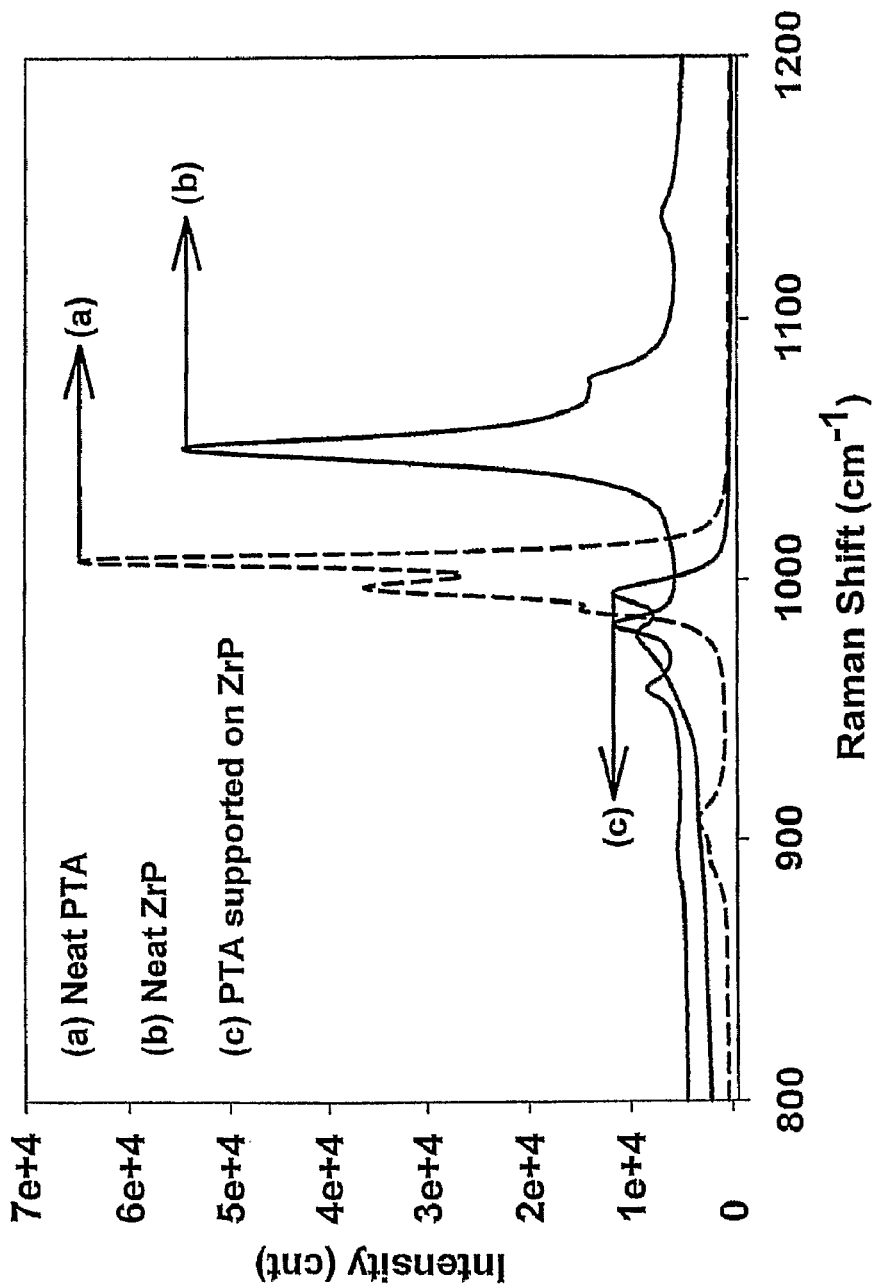
FIG. 2 shows plots of intensity versus Raman shift of a sample of an HPA immobilized on a metal phosphate in comparison with the neat HPA and the neat metal phosphate.

To a stirred reaction vessel charged 5 ml of aqueous 10 weight/volume % phosphotungstic acid and added 1 ml of $ZrOCl_2.8H_2O$ (10 weight/volume %) aqueous solution. A white precipitate was formed. The product was heated to 60° C. for 30 minutes and cooled to room temperature. The precipitate was washed with distilled water, isolated by filtration and dried to get a fee flowing powder product. The Raman spectra of the immobilized sample is compared with neat zirconium phosphate and neat phosphotungstic acid (FIG. 2). It is evident from the spectral data that phosphotungstic acid is successfully immobilized on water insoluble inorganic phosphate support.

Example 8

Immobilization of Phosphotungstic Acid on Vanadium Phosphate

To a stirred reaction vessel we charged 10 grams phosphotungstic acid, 25 ml dimethyl acetamide followed by very slow addition of 5 ml of vanadium oxy chloride. A reddish brown precipitate thus formed was stirred at room temperature for 1 hour followed by heating at 60° C. for 30 minutes. The precipitate was washed with isopropyl alcohol first and then with distilled water, isolated by filtration and dried to get a fee flowing powder product.

Example 9

Immobilization of Phosphotungstic Acid on Titanium Phosphate

To a stirred reaction vessel we charged 5 ml of aqueous 10 weight/volume % phosphotungstic acid and added 5 ml of 15 wt % titanium oxy chloride in HCl solution. The pH of the resultant solution was raised to 6.5 using 1N NaOH. The product formed as a white precipitate was heated to 60° C. for 30 minutes and cooled to room temperature. The precipitate was washed with distilled water, isolated by filtration and dried to get a free flowing powder product.

What is claimed is:

1. A fuel cell component made with a composite comprising a proton conducting polymer, a water insoluble proton conducting inorganic material, and a heteropolyacid immobilized by chemically bonding to the inorganic material, wherein the composite comprises particles having an average diameter less than about 30 nanometers.

2. The fuel cell component defined in claim 1 wherein the proton conducting polymer has functional groups causing the polymer to act as a steric stabilizer during production of the composite thereby stabilizing the growing particles.

3. The fuel cell component defined in claim 1 wherein the immobilization of heteropolyacid is carried out in polymer solution or in polymer film.

4. The fuel cell component defined in claim 1 wherein the heteropolyacid includes tungsten or molybdenum.

5. The fuel cell component defined in claim 1 wherein the inorganic material is a metal compound.

6. The fuel cell component defined in claim 1 wherein the heteropolyacid is immobilized on water insoluble metal phosphate or metal phosphonate.

7. The fuel cell component defined in claim 1 wherein the amount of immobilized HPA varies from 0.5 to 75 wt %.

8. The fuel cell component defined in claim 1 wherein the ratio of HPA to inorganic insoluble inorganic precursor ranges between 0.1 and 25.

9. The fuel cell component defined in claim 1 wherein the acidity of immobilized HPA and unmodified HPA are substantially identical.

10. The fuel cell component defined in claim 1 wherein the surface area of immobilized HPA is substantially identical to or greater than unmodified HPA.

11. The fuel cell component defined in claim 1 wherein the porosity of immobilized HPA is substantially identical to or greater than unmodified HPA.

12. The fuel cell component defined in claim 1 wherein the immobilized HPA is not substantially soluble and/or extractable by liquid water.

13. The fuel cell component defined in claim 1 wherein the immobilized HPA is not substantially soluble and/or extractable by 1.5 M sulfuric acid.

14. The fuel cell component defined in claim 1 wherein the immobilized HPA is not substantially soluble and/or extractable by liquid methanol, ethanol, butanol and higher alcohols.

15. The fuel cell component defined in claim 1 wherein the immobilized HPA is not substantially soluble and/or extractable by hydrogen peroxide.

16. The fuel cell component defined in claim 1 wherein the immobilized HPA is not substantially soluble and/or extractable by formic acid.

17. The fuel cell component defined in claim 1 wherein the fuel cell component is a membrane electrode assembly and the composite is used as a binder in the membrane electrode assembly.

18. The fuel cell component defined in claim 1 wherein the composite has substantially similar structure of the unmodified heteropolyacid.

19. The fuel cell component defined in claim 18 wherein the composite has a high acidity characterized by very high ion exchange capacity greater than 1.0 ineq/g.

20. The fuel cell component defined in claim 18 wherein the fuel cell component is a polymer electrolyte membrane having a conductivity of at least 0.01 S/cm at a humidity of 50%.

21. The fuel cell component defined in claim 18 wherein the heteropolyacid and the inorganic material do not include functional groups.

22. The fuel cell component defined in claim 1 wherein the composite has a conductivity of at least 0.0001 S/cm at a relative humidity of 50%.

* * * * *

UNITED STATES PATENT AND TRADEMARK OFFICE
CERTIFICATE OF CORRECTION

PATENT NO.       : 8,129,069 B2
APPLICATION NO.  : 11/992826
DATED            : March 6, 2012
INVENTOR(S)      : Ramanathan S. Lalgudi, Jay R. Sayre and Bhima R. Vijayendran It is certified that error appears in the above-identified patent and that said Letters Patent is hereby corrected as shown below:

Column 8,  Line 55,   after and dried to get a, change "fee" to -- free --.

Column 9,  Line 6,    after a, change "fee" to -- free --.

Column 10, Line 34,   after 1.0, change "ineq/g" to -- meq/g --.

Signed and Sealed this
Eighteenth Day of September, 2012

David J. Kappos
*Director of the United States Patent and Trademark Office*